United States Patent
Lee et al.

(10) Patent No.: US 7,176,614 B2
(45) Date of Patent: Feb. 13, 2007

(54) FLAT PANEL DISPLAY DEVICE HAVING ANODE SUBSTRATE INCLUDING CONDUCTIVE LAYERS MADE OF CARBON-BASED MATERIAL

(75) Inventors: Soo-Joung Lee, Ahnyang (KR); Hun-Young Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 152 days.

(21) Appl. No.: 10/706,984

(22) Filed: Nov. 14, 2003

(65) Prior Publication Data

US 2004/0140755 A1 Jul. 22, 2004

(30) Foreign Application Priority Data

Jan. 17, 2003 (KR) .................... 10-2003-0003278

(51) Int. Cl.
*H01J 1/70* (2006.01)
(52) U.S. Cl. .................... 313/496; 345/75.2
(58) Field of Classification Search ........ 313/495–497; 315/169.1; 345/75.2
See application file for complete search history.

(56) References Cited

U.S. PATENT DOCUMENTS

| 5,534,749 | A | * | 7/1996 | Ohoshi et al. | ............. 313/497 |
|---|---|---|---|---|---|
| 5,939,823 | A | * | 8/1999 | Kiyomiya et al. | .......... 313/495 |
| 6,103,142 | A | * | 8/2000 | Itoh et al. | ............. 252/301.36 |
| 6,175,344 | B1 | * | 1/2001 | Tanaka | ..................... 345/75.2 |
| 6,359,383 | B1 | * | 3/2002 | Chuang et al. | ............. 313/496 |
| 6,713,953 | B1 | * | 3/2004 | Sung et al. | ................ 313/495 |
| 2002/0001905 | A1 | * | 1/2002 | Choi et al. | .................. 438/268 |
| 2002/0160111 | A1 | * | 10/2002 | Sun et al. | ................ 427/248.1 |

\* cited by examiner

*Primary Examiner*—Ashok Patel
*Assistant Examiner*—Christopher M. Raabe
(74) *Attorney, Agent, or Firm*—Robert E. Bushnell, Esq.

(57) ABSTRACT

A flat panel display device includes a first substrate, an electron emission assembly formed on the first substrate, a second substrate provided at a predetermined distance from the first substrate and forming a vacuum assembly with the first substrate, and an illumination assembly formed on the second substrate, the illumination assembly being illuminated by electrons emitted from the electron emission assembly. The illumination assembly includes at least one anode electrode formed on a surface of the second substrate facing the first substrate, phosphor layers formed in a predetermined pattern on the at least one anode electrode, and conductive layers formed of a carbon-based material on the phosphor layers.

18 Claims, 4 Drawing Sheets

Fig. 8

FLAT PANEL DISPLAY DEVICE HAVING ANODE SUBSTRATE INCLUDING CONDUCTIVE LAYERS MADE OF CARBON-BASED MATERIAL

CLAIM OF PRIORITY

This application makes reference to, incorporates the same herein, and claims all benefits accruing under 35 U.S.C. §119 from an application for FLAT PANEL DISPLAY DEVICE HAVING ANODE PLATE FORMED CARBON-BASED CONDUCTIVE LAYER earlier filed in the Korean Intellectual Property Office on 17 Jan. 2003 and there duly assigned Ser. No. 2003-3278.

BACKGROUND OF THE INVENTION

1. Technical Field

The present invention relates to a flat panel display device, and more particularly, to a field emission display.

2. Related Art

A flat panel display device typically includes two substrates, in which a cathode assembly is provided on one of the substrates and an anode assembly is provided on the other of the substrates. Electrons emitted from the cathode assembly strike elements of the anode assembly to illuminate the same, thereby realizing the display of predetermined images.

A field emission display (FED) is a type of flat panel display device. The following two references are exemplars of features related to field emission devices. The U.S. Pat. No. 5,593,562 issued to Vickers on 14 Jan. 1997 and entitled METHOD FOR IMPROVING FLAT PANEL DISPLAY ANODE PLATE PHOSPHOR EFFICIENCY discloses a method of fabricating an anode plate for use in a field emission device. The U.S. Pat. No. 5,830,527 issued to Vickers on 3 Nov. 1998 and entitled FLAT PANEL DISPLAY ANODE STRUCTURE AND METHOD OF MAKING discloses a structure and method of fabricating an anode plate for use in a field emission device. Such field emission displays have conductive material formed between phosphors on an anode electrode. We have discovered that the removal process is difficult to control with this method of depositing conductive material on the phosphors and then removing predetermined areas of the conductive material.

SUMMARY OF THE INVENTION

It is therefore, an object of the present invention to provide an improved process of making, and an improved field emission display.

It is another object to provide a field emission display made by depositing conductive material onto phosphor and removing predetermined areas of the phosphor, in a process that is amenable to reliable control.

These and other objects may be attained according to the principles of the present invention with a process and a flat panel display device having an anode substrate in which good electric conduction is realized between phosphor particles forming phosphor layers. The present invention contemplates a flat panel display device, in which conductive layers for removing electric charges accumulated on surfaces of phosphors are easily formed.

In one embodiment, the present invention provides a flat panel display device including a first substrate; an electron emission assembly formed on the first substrate; a second substrate provided at a predetermined distance from the first substrate and forming a vacuum assembly with the first substrate; and an illumination assembly formed on the second substrate, the illumination assembly being illuminated by electrons emitted from the electron emission assembly. The illumination assembly includes at least one anode electrode formed on a surface of the second substrate facing the first substrate, phosphor layers formed in a predetermined pattern on the at least one anode electrode, and conductive layers formed of a carbon-based material on the phosphor layers.

Preferably, the conductive layers are made of carbon nanotubes and are formed using electrophoresis.

The at least one anode electrode may be formed in a predetermined anode electrode pattern of a plurality of anode electrodes formed at a predetermined distance on the second substrate to form a striped pattern. Also, black matrix layers may be formed between the anode electrodes, in a state of not making electrical contact with the anode electrodes, or formed between the anode electrodes in a state of making electrical contact with the anode electrodes. The black matrix layers have electrical conductibility and the conductive layers are in electrical contact with the black matrix layers. That is, the black matrix layers conduct electricity and the conductive layers electrically contact the black matrix layers.

The at least one anode electrode may be formed as a single unit over all of the surface of the second substrate facing the first substrate. The phosphor layers and black matrix layers are formed on the anode electrode, in such a way as to be electrically connected or as to lack electrical connection to the anode electrode as described in the foregoing paragraphs.

The electron emission assembly includes cathode electrodes formed on a surface of the first substrate facing the second substrate; at least one gate electrode formed on the surface of the first substrate facing the second substrate; an insulation layer formed between the cathode electrodes and the at the least one gate electrode; and electron emission sources mounted within holes formed in the cathode electrodes and the gate electrodes such that the electron emission sources are formed on the cathode electrodes.

The electron emission assembly can include cathode electrodes formed on a surface of the first substrate facing the second substrate; at least one gate electrode formed on the surface of the first substrate facing the second substrate; an insulation layer formed between the cathode electrodes and the at the least one gate electrode; and electron emission sources mounted on the cathode electrodes.

The electron emission sources are made of a carbon-based material such as carbon nanotubes, fullerenes such as $C_{60}$, diamond-like carbon (DLC), and graphite, or a mixture of these carbon-based materials. The electron emission sources are made into a flat shape. In another aspect, the electron emission sources are made of a metal material such as molybdenum and formed into a circular shape.

The present invention provides a method for manufacturing a flat panel display device by forming anode electrodes on a substrate; forming phosphor layers on the anode electrodes; preparing a solution in which carbon-based material is dispersed; immersing the substrate on which the phosphor layers are to be formed into the solution and adhering the carbon-based material on a surface of the phosphor layers by electrophoresis; and cleaning and then drying the substrate and elements formed thereon.

In accordance with the principles of the present invention, as embodied and broadly described, the present invention provides a flat panel display device that may be constructed with a first substrate; an electron emission assembly being formed on the first substrate; a second substrate provided at a predetermined distance from the first substrate, said first and second substrates forming a vacuum assembly; and an illumination assembly formed on the second substrate, with the illumination assembly being illuminated by electrons emitted from the electron emission assembly. The illumination assembly may be constructed with at least one anode electrode being formed on a first surface of the second substrate to face the first substrate, and with the first surface of the second substrate facing the first substrate; a plurality of phosphor layers formed in a predetermined pattern on at least one anode electrode; and a plurality of conductive layers formed on the phosphor layers, with the plurality of conductive layers being formed of a carbon-based material.

In accordance with the principles of the present invention, as embodied and broadly described, the present invention provides a method for manufacturing a flat panel display device that may be practiced by forming anode electrodes on a substrate, forming phosphor layers on the anode electrodes, immersing the substrate in a solution including dispersed carbon-based material, coating the carbon-based material adhering onto a surface of the phosphor layers by electrophoresis, and cleaning and then drying the substrate.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE EMBODIMENTS

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description of the best mode contemplated of carrying out the invention, which follows, is to be understood as being a broad, teaching disclosure directed to persons of skill in the appropriate arts, and not as limiting upon the present invention.

Illustrative embodiments of the best mode of carrying out the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

In the drawings, the thickness of layers and regions are exaggerated for clarity. It will also be understood that when a layer is referred to as being "on" another layer or substrate, it can be directly on the other layer or substrate or alternatively, intermediate or intervening layers may also be present. Moreover, each embodiment described and illustrated herein includes its complementary conductivity type embodiment as well. A field emission display (FED) is a type of flat panel display device. In the field emission display, cold cathode sources, which are the sources of electrons, are provided on a cathode substrate. Also, formed on an anode substrate are phosphor layers, which are struck by the emitted electrons to be excited by the same and realize predetermined colors. That is, the phosphor layers are illuminated by the landing of the electrons thereon to realize predetermined images.

The phosphor layers illuminated in this manner are formed of phosphors, which are realized through non-conductive particles. As a result, during operation of the field emission display, there is a high probability that electric charges will accumulate on surfaces of the phosphors when they are illuminated. These electric charges interfere with the landing of electron beams formed by the emitted electrons, on their intended phosphor layers. That is, the electric charges accumulated on the surfaces of phosphors deleteriously affect the paths of travel of the electron beams so that the electron beams do not land on their intended phosphor layers. This makes it difficult to attain the desired brightness characteristics of the field emission display.

The accumulated electric charge may also abruptly discharge and cause arcing when the display is driven. In order to obtain a desired brightness in display devices including a field emission display, a predetermined amount of electrons are needed. With the accumulation of the electric charges on the phosphors as described above however, it is necessary to irradiate electron beams having an electric charge amount that is as great as that accumulated on the phosphors. This makes it necessary to increase the required voltage applied to the display for electron beam emission, which undesirably increases power consumption.

Some field emission displays may attempt to correct some of these problems by coating the surfaces of each of the phosphor layers with a conductive layer. The conductive layers increase the illumination efficiency of the phosphors by interaction with the electron beams so that brightness is improved. Such field emission displays have conductive material formed between phosphors on an anode electrode. An example of the conductive material is aluminum metal film. The conductive material removes electric charges that may form on the surfaces of the phosphors. After providing phosphors on the anode electrode and the conductive material on the phosphors, portions of the phosphors, that is, non-active surface layers formed on the surfaces of the phosphor particles, and the conductive material deposited on the phosphors are removed by a method such as sputtering, etching, or ion milling.

In such a method of depositing conductive material on the phosphors and removing predetermined areas of the conductive material however, the removal process is difficult to control. As a result, it is hard to perform formation so that adequate conductive material remains in a suitable manner between the phosphors. This ultimately results in complications in the placement of conductive material suggested by the foregoing patents in order to satisfactorily electrically interconnect the phosphors as to reliably remove the electric charge accumulated on the surfaces of the phosphors.

Moreover, when the conductive material is deposited on the phosphors using some of the methods taught by those patents, it is necessary to use expensive manufacturing equipment. This increases overall production costs.

Furthermore, with the coating of the surfaces of the phosphors with metal films in an attempt to improve the brightness of the device, when the completed device is driven at a low voltage applied to the anode electrode, it is difficult for the electrons emitted from the electron emission sources to pass through the metal films in order to illuminate the phosphors. Here, an example of a low voltage is a few kilovolts (kV). Although it is possible to increase the drive voltage so that the electrons are able to penetrate the metal films and illuminate the phosphors, doing so leads to wasteful increases in power consumption.

Figure 1:
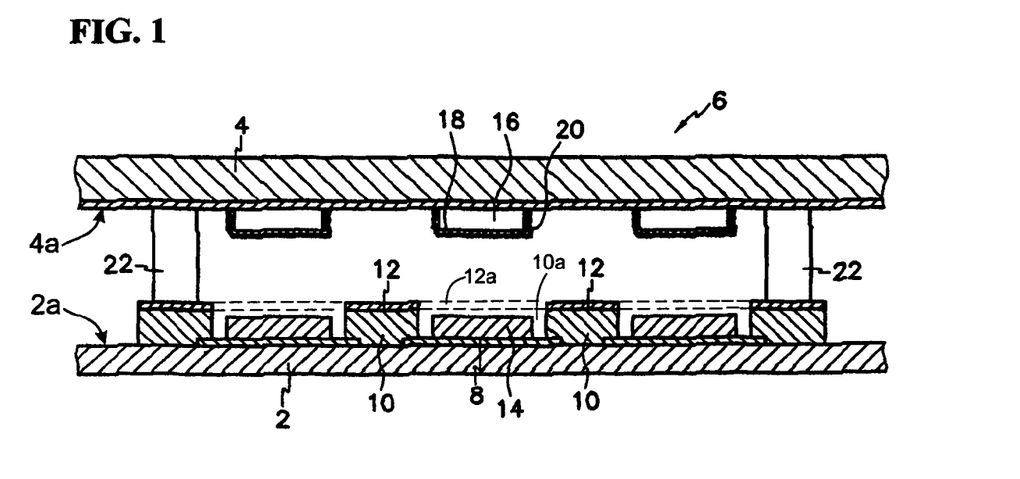
FIG. 1 is a partial cross-sectional view of a flat panel display device constructed as a first embodiment of the present invention.

FIG. 1 is a partial sectional view of a flat panel display device constructed as a first embodiment of the present invention. In the first embodiment, a field emission display is used as the flat panel display of the device. It should be noted however, that the present invention is not limited to only this type of flat panel display device.

As shown in the drawing, the field emission display (FED) includes a first substrate (or cathode substrate) 2 having predetermined dimensions, and a second substrate (or anode substrate) 4 having predetermined dimensions and being provided substantially in parallel to the first substrate 2 with a predetermined gap therebetween. First and second substrates 2 and 4 are connected in this state to form an exterior of the field emission display, and the air between the facing surface 2a of first substrate 2 and the facing surface 4a of second substrate 4 is evacuated to thereby form a vacuum assembly 6.

An electron emission assembly is formed on the first substrate 2. An illumination assembly is formed on the second substrate 4. The illumination assembly exhibits predetermined images by being illuminated by electrons emitted from the electron emission assembly. These structures will be described in more detail below.

With respect to the electron emission assembly, cathode electrodes 8 are formed on the facing surface 2a of first substrate 2. An insulation layer 10 is formed over and between cathode electrodes 8, and gate electrodes 12 are formed on the insulation layer 10. Holes 10a and 12a are formed respectively in insulation layer 10 and between gate electrodes 12, and electron emission sources 14 are placed in holes 10a that have been formed in insulation layer 10 and in holes 12a that have been formed between gate electrodes 12, so that electron emission sources 14 are positioned on the surface of cathode electrodes 8 opposite from cathode substrate 2.

Cathode electrodes 8 are formed on the facing surface 2a of first substrate 2 in a predetermined pattern (for example, a striped pattern of spaced-apart rows), aligned along a first direction, and with predetermined gaps between the edges of neighboring cathode electrodes 8. Insulation layer 10 is formed over an entire surface of the first substrate 2, covering cathode electrodes 8. Further, gate electrodes 12 are formed on insulation layer 10 in a predetermined pattern (for example, a striped pattern), along a second direction, which may be perpendicular to the first direction, and with predetermined gaps between the stripes of gate electrodes 12. Holes 10a and 12a are formed respectively in insulation layer 10 and between gate electrodes 12 as described above. Holes 10a and 12a are formed at corresponding concurrent locations.

Electron emission sources 14 are formed within holes 10a and 12a and make electrical contact with cathode electrodes 8 as described above. Electron emission sources 14 are formed in a flat configuration and made of a carbon-based material such as carbon nanotubes, fullerenes, diamond-like carbon (DLC), or graphite, or a mixture of two or more of these carbon-based materials.

Fullerenes are large carbon-cage molecules. The most common fullerene is $C_{60}$. Three other fullerenes, namely $C_{70}$, $C_{76}$, and $C_{84}$, for instance, may be used in the formation of electron emission sources 14.

In the first preferred embodiment of the present invention, carbon nanotubes are used for electron emission sources 14. The present invention is not limited however, to these materials and to this configuration for electron emission sources 14. By way of example, it is possible to use a metal material such as molybdenum, and it is possible to construct electron emission sources 14 with a circular rather than with an orthogonal or with a rectangular shape.

With this configuration of the electron emission assembly, when external voltages are applied to cathode electrodes 8 and gate electrodes 12, electrons are emitted from electron emission sources 14 by electric fields formed between cathode electrodes 8 and gate electrodes 12.

In the construction of the illumination assembly, anode electrodes 16 are formed on surface 4a of second substrate 4 opposing the facing surface 2a of first substrate 2. Also, R, G, and B phosphor layers 18 are formed over anode electrodes 16, and conductive layers 20 are formed on the phosphor layers 18. Anode electrodes 16 are formed of a transparent material such as indium tin oxide (ITO), and are provided in a space-apart striped pattern along the same direction as cathode electrodes 8 and are substantially aligned to correspond to the positions of cathode electrodes 8.

Phosphor layers 18 are formed on anode electrodes 16 using a manufacturing method such as electrophoresis, that is, by the migration of charged molecules in an electrical field.

Figure 2:
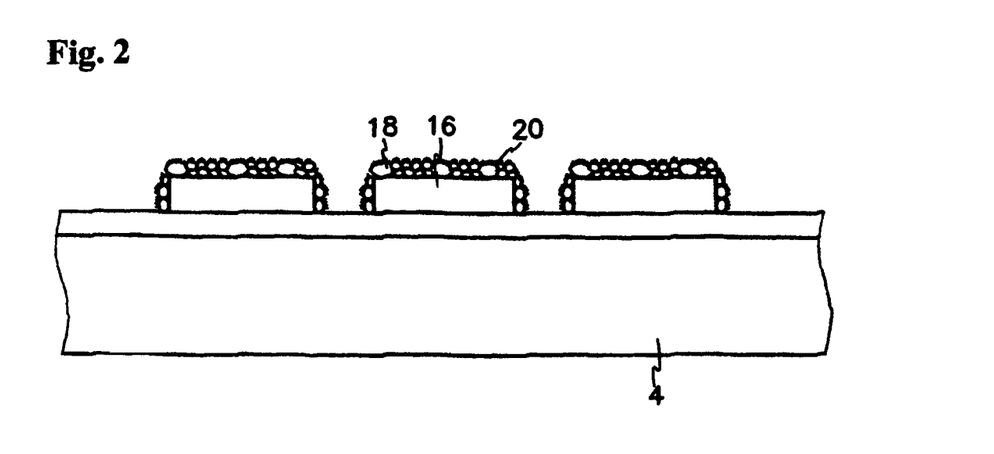
FIG. 2 is a partial cross-sectional view of an anode substrate of the flat panel display of FIG. 1, constructed in accordance with the principles of the present invention.

Also, conductive layers 20 are formed on outer surfaces of the phosphor layers 18. Conductive layers 20 induce conduction paths between phosphor particles of phosphor layers 18 to prevent the easy accumulation of electric charges on phosphor layers 18 during operation of the field emission display. Conductive layers 20 may be made of a carbon-based material in the practice of the present invention. For example, with reference to FIG. 2, conductive layers 20 may be formed of carbon nanotubes that adhere to the exposed surfaces of the phosphor molecules of the phosphor layers 18. FIG. 2 is a partial sectional view of anode substrate 4 for the flat panel display of FIG. 1, constructed in accordance with the principles of the present invention.

Conductive layers 20 may be manufactured using electrophoresis. The technique for the manufacture of the conductive layers 20 will now be described.

Figure 3:
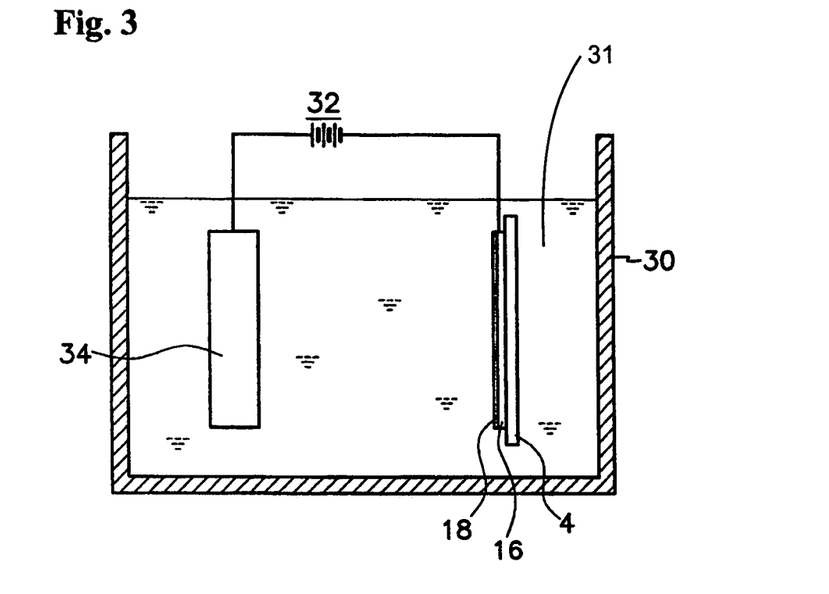
FIG. 3 is a schematic view used to describe a method for manufacturing a conductive layer according to the principles of the present invention.

Referring now to FIG. 3, a schematic view used to describe a method for manufacturing a conductive layer according to an embodiment of the present invention, first, following the formation of anode electrodes 16 and phosphor layers 18 on the facing surface 4a of the second, or anode, substrate 4 as described above, anode substrate 4 is placed in a tank 30 filled with a solution 31 that contains carbon nanotubes. Solution 31 is an organic solvent or pure water containing metal salt and a dispersion agent such as a dispersant. Also, solution 31 is preferably placed in another tank through which ultrasonic waves are passed for a predetermined amount of time in order that the carbon nanotubes do not become purified and the purified carbon nanotubes are dispersed.

Anode substrate 4 is submerged in a tank 30 below the surface of solution 31, at a predetermined distance from an electrode plate 34 that is also positioned within the tank 30. An external power source such as a battery 32 is connected between electrode 34 and cathode electrodes 16, which are already formed on anode substrate 4. In this state, a predetermined bias voltage is applied between electrode plate 34 and cathode electrode 16, and a direct current flows through electrode plate 34 and anode electrodes 16 for a period of between one second and a few minutes. As a result, these carbon nanotubes which are dispersed in solution 31 move toward anode substrate 4 and eventually adhere to the exposed surfaces of the phosphor particles that form phosphor layers 18. When this process is completed, anode substrate 4 is removed from the tank 30, cleaned with an organic solvent or with pure water, then dried, thereby completing manufacture of the conductive layers 20.

With respect to the carbon nanotubes dispersed in solution 31 becoming purified during this process, it is preferable that the carbon nanotubes have a length of approximately 5 micrometers (μm) or less. Also, since the presence of the dispersant included in solution 31 may actually induce cohesion of the carbon nanotube particles at the first stage when the carbon nanotube particles are dispersed in solution 31, it is preferable that the dispersant be either diluted or be omitted from the process.

First and second substrates 2 and 4, where the electron emission assembly and the illumination assembly are formed, respectively, as described above, are interconnected with a predetermined gap therebetween in a manner that the electron emission assembly and the illumination assembly face each other. A sealant (not shown) is applied on a circumference of surfaces of the first and second substrates 2 and 4 facing each other to interconnect these elements as an integrated and unitary single structural monolithic unit. Before making this structural connection of the first and second substrates 2 and 4, spacers 22 are provided therebetween at non-pixel regions. The spacers 22 maintain the predetermined gap between the first and second substrates 2 and 4.

Figure 4:
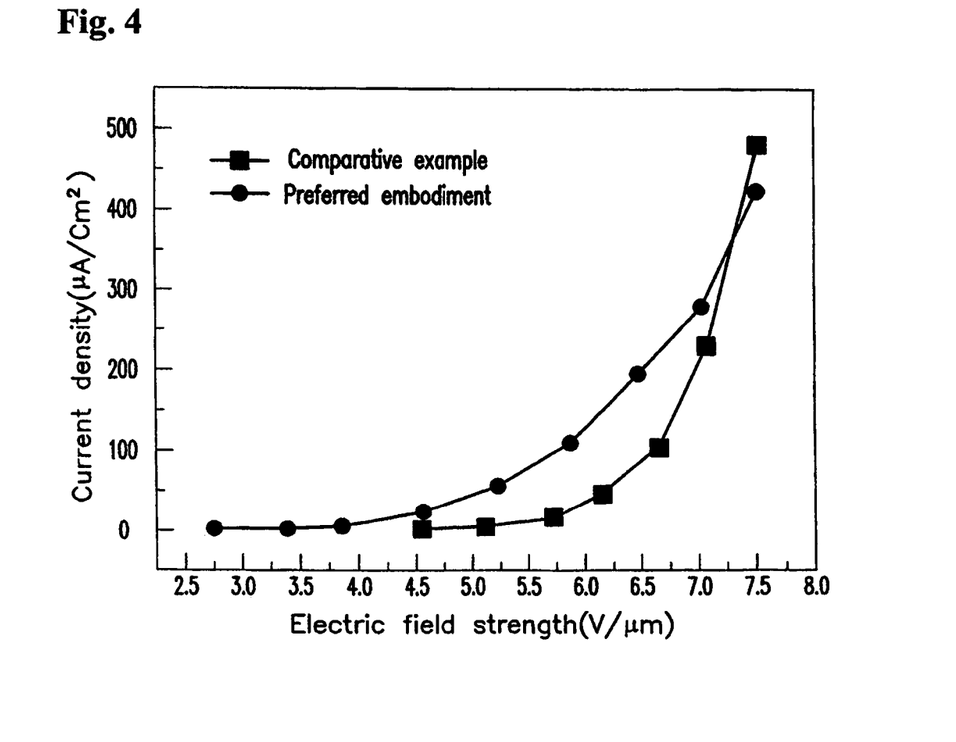
FIG. 4 is a two-coordinate graph used to compare characteristics of a first display device, corresponding to the first embodiment of the present invention, with characteristics of a second display device serving as a comparative example.

FIG. 4 is a graph used to compare a first display, corresponding to the first embodiment of the present invention, with a second display serving as a comparative example. The field emission display structured as in the present invention described above removes the accumulation of electric charge that occurs on the phosphor layers 18 during operation, and attains improved brightness characteristics over comparable devices that do not include conductive layers 20. This is shown in the graph of FIG. 4.

With reference to FIG. 4, the field emission display of the first embodiment of the present invention exhibits a higher current density over the comparative exemplary device at the same electric field strengths, except at the highest levels of electric field strength where it is undesirable to operate a display device. This indicates that in the field emission display of the present invention, when the electrons emitted from electron emission sources 14 are directed toward phosphor layers 18 and strike the same, the electric charge on the surfaces of the phosphor layers 18 is reduced by flowing through electrically conductive layers 20 to the outside of the vacuum assembly 6. Also, such a result is an indication of how the illumination of phosphor layers 18 is increased by the landing of electrons. In fact, through experimentation, the inventors determined that an approximately 7% greater brightness is realized in the first preferred embodiment of the present invention when compared to the comparative exemplar.

A more detailed description of the formation of conductive layers 20 on the second substrate will be described. First, following the formation of phosphor layers 18 on anode substrate 4 by using electrophoresis, carbon nanotubes and metallic salt are dispersed in pure water to prepare the solution. The amount of the carbon nanotubes can be approximately 0.5 grams (g), for example, and the metallic salt can be one or more of the salts of magnesium (Mg), for example.

To improve the degree of dispersion of the carbon nanotubes, the solution may undergo an ultrasonic wave process for roughly sixty minutes. The second substrate 4 is then immersed in the solution, and a bias voltage is applied to the electrode plate 34 and the anode electrodes 16 for 20 seconds. A bias voltage of approximately 20 volts (V) is applied through a power source 32. As a result, the carbon nanotubes dispersed in the solution adhere to phosphor layers 18. Anode substrate 4 is then removed from the solution, cleaned for approximately ten seconds, and dried for about sixty minutes at a temperature of approximately 100° Celsius (°C) to thereby complete the formation of conductive layers 20. The field emission display of the comparative exemplar is configured identically as the first example of the present invention, except that the comparative exemplar does not include the formation of conductive layers.

Figure 5:
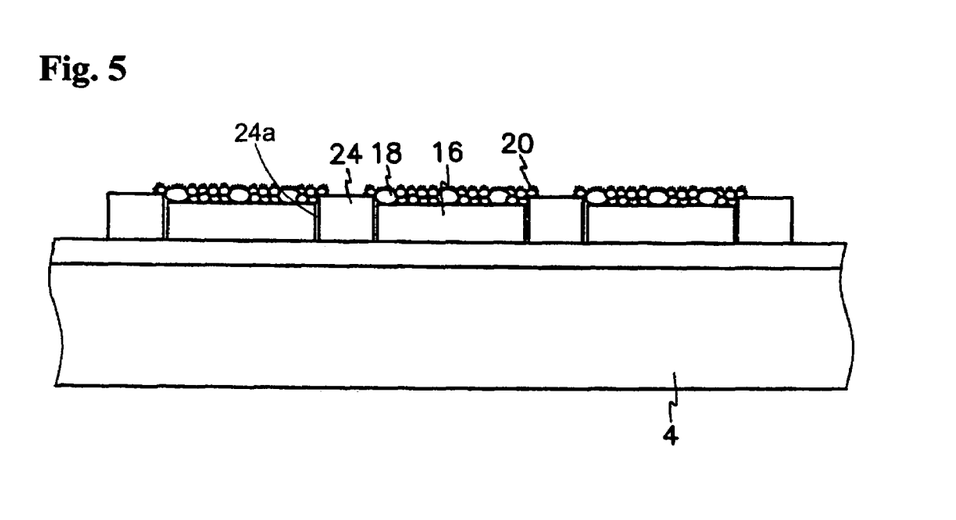
FIG. 5 is a partial cross-sectional view of an anode substrate constructed as a modification of the examples of the first embodiment of the present invention.
Figure 6:
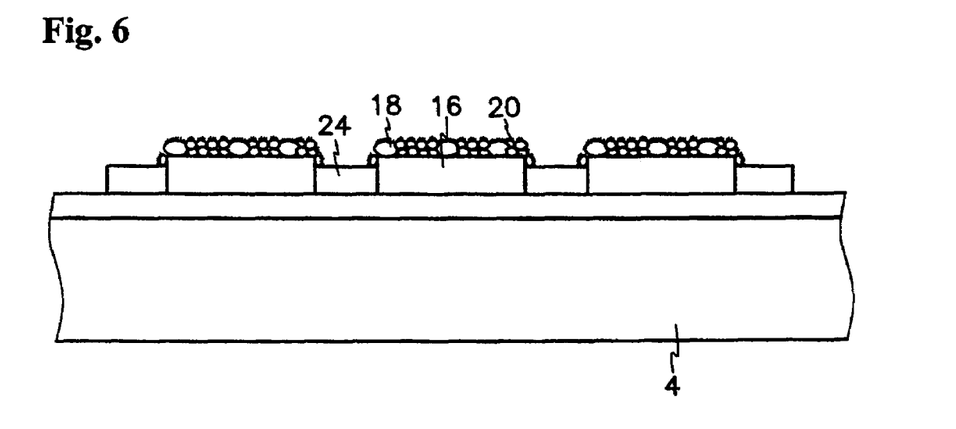
FIG. 6 is a partial cross-sectional view of an anode substrate modified from the examples of the first embodiment of the present invention.

FIG. 5 is a partial sectional view of an anode substrate constructed as a modification of the first embodiment of the present invention. FIG. 6 is a partial sectional view illustrating an anode substrate constructed as another modification of the first embodiment of the present invention.

With reference to FIGS. 5 and 6, the field emission display constructed according to the first embodiment of the present invention may also include black matrix layers 24 formed on the second substrate 4 interposed between phosphor layers 18 and anode electrodes 16. Black matrix layers 24 are formed of electrically conductive materials and serve to improve the contrast of the field emission display. The black matrix layers 24 may be mounted without physically contacting the anode electrodes 16 as shown in FIG. 5, where interstices or gaps 24a occur between the sidewalls of neighboring anode electrodes 16 and black matrix layers 24, or alternatively, black matrix layers 24 may be mounted between and physically contact anode electrodes 16 as shown in FIG. 6. In the latter case, the black matrix layers 24 also physically contact the conductive layers 20.

In the case where the black matrix layers 24 are formed without making contact with the anode electrodes, such as is illustrated by FIG. 5, it is possible to drive the display using an anode drive method. Further, in addition to electrophoresis, the phosphor layers 18 may be formed through various other methods such as a slurry method or a screen printing method.

In the case where the black matrix layers 24 are formed in physical contact with anode electrodes 16, such as is illustrated by FIG. 6, there are limitations given with respect to the forming of the phosphor layers 18 (for example, it is not possible to use electrophoresis to form phosphor layers 18). However, such a configuration allows for the current-sending effects of black matrix layers 24 to be maximized.

In the flat panel display device of the present invention, as a result of the improvements made in the conductive layers 20 formed on the phosphor layers 18, when the electrons emitted from the electron emission assembly strike the phosphor layers 18, electric charges do not accumulate on the surfaces of phosphor layers 18 and instead are induced to travel the outside of the video display device. This improves overall brightness of the visual images broadcast by the display device to its audience while concomitantly increasing the lifespan of phosphor layers 18.

Furthermore, the electric charges accumulated on the surfaces of phosphor layers 18 may also be effectively removed, even under low voltage driving conditions. Therefore, arcing caused by the accumulated electric charges is substantially prevented.

Also, in the case where conductive layers 20 are formed of carbon nanotubes, the carbon nanotubes adsorb impure gases within vacuum assembly 6. For example, the adsorbed impure gases may include oxygen gas ($O_2$), carbon monoxide gas (CO), and nitrogen gas ($N_2$). This improves the state of the vacuum within vacuum assembly 6.

In addition, since the relatively easy electrophoresis process may be used to produce conductive layers 20, the overall fabrication and manufacture of the field emission display is significantly simplified.

Although preferred embodiments of the present invention have been described in detail herein above, it should be clearly understood that many variations and modifications of the basic principles and the inventive concepts taught herein which may appear to those skilled in the applicable art, will still fall within the spirit and scope of the present invention, as defined in the appended claims.

Figure 7:
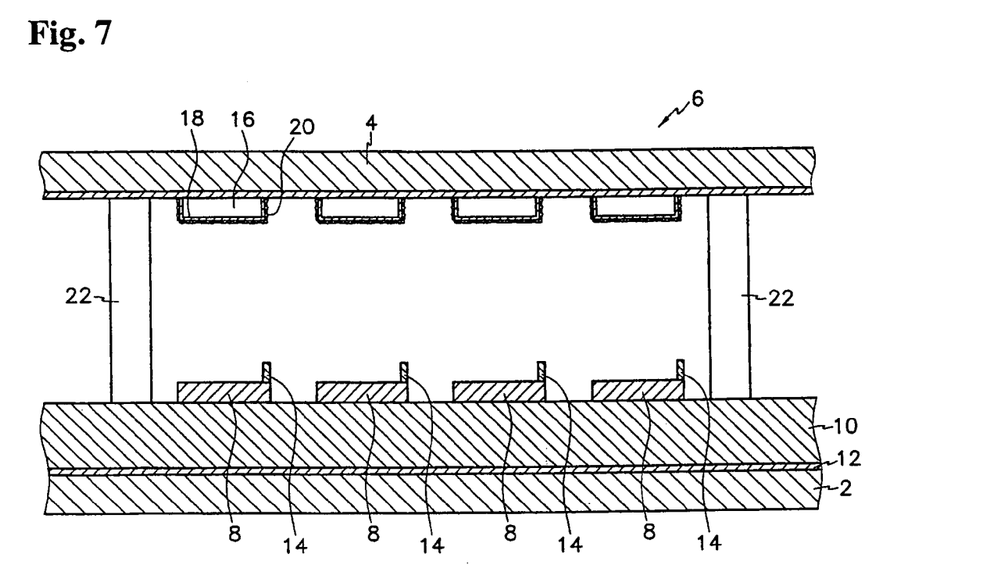
FIG. 7 is a partial cross-sectional view of a flat panel display constructed as a second embodiment of the present invention.

Referring now to FIG. 7 as an example, elements that form the electron emission assembly, may be formed in a different order and in an alternative configuration than that described above. That is, gate electrodes 12 may be first formed on cathode substrate 2, then an insulation layer 10 may be formed on the gate electrodes 12. FIG. 7 is a partial sectional view of a flat panel display which illustrates a second embodiment of the present invention.

Cathode electrodes 8 are then provided on insulation layer 10 and electron emission sources 14 are formed on cathode electrodes 8. Gate electrodes 12 and the cathode electrodes 8 may be formed identically to the way they are formed in the first preferred embodiment of the present invention. That is, the gate electrodes 12 and the cathode electrodes 8 are formed in a striped patterns that overlay and perpendicularly intersecting one another. The electron emission sources 14 may be made from the same materials as may be used in the fabrication of the first preferred embodiment.

Figure 8:
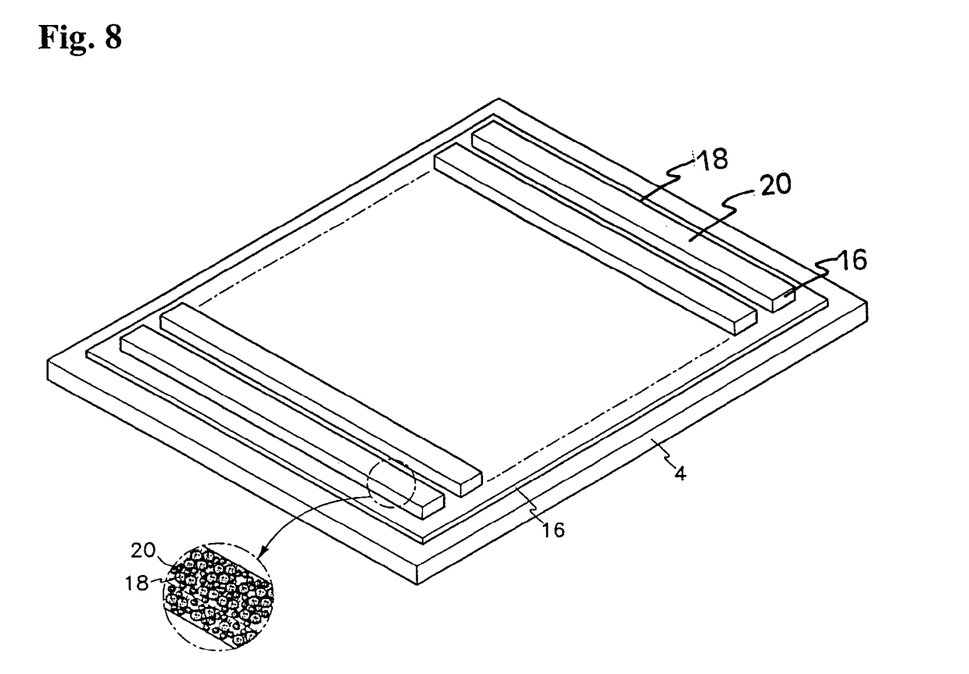
FIG. 8 is a partial orthogonal view of a flat panel display constructed as a third embodiment of the present invention.

Turning now to FIG. 8, unlike the striped pattern used in the first embodiment, it is possible to form a single anode electrode 16 over an entire surface of a second substrate 4 as shown by FIG. 8. In this embodiment, phosphor layers 18, conductive layers 20, and black matrix layers (not shown) may be formed identically as in the first embodiment of the present invention. FIG. 8 is a partial sectional view of a flat panel display which illustrates a third embodiment of the present invention. As shown in FIG. 8, the single anode electrode 16 covers the entire surface of second substrate 4, or at least covers a large percentage of the surface of second substrate 4. For example, as shown in FIG. 8, anode electrode 16 can be said to be a single large unit 16 that covers over approximately 80% of the surface of the second, or anode, substrate 4 facing the first, or cathode, substrate 2.

As shown in FIG. 1, the major surface 2a of the first, or cathode, substrate 2 that faces anode substrate 4 can be referred to as the facing surface 2a of cathode substrate 2, as the inside surface 2a of cathode substrate 2, or as the first surface 2a of cathode substrate 2. The surface major 4a of the second substrate 4 that faces the cathode substrate 2 can be referred to as the facing surface 4a of the second, or anode, substrate 4, as the inside surface 4a of anode substrate 4, or as the first surface 4a of anode substrate 4.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit and scope of the applicant's general inventive concept.

What is claimed is:

1. A flat panel display device, comprising:
   a first substrate;
   an electron emission assembly being formed on said first substrate;
   a second substrate being provided at a predetermined distance from said first substrate, said first and second substrates forming a vacuum assembly; and
   an illumination assembly being formed on said second substrate, said illumination assembly being illuminated by electrons emitted from said electron emission assembly;
   said illumination assembly comprising:
      at least one anode electrode being formed on a first surface of said second substrate to face said first substrate, the first surface of said second substrate facing said first substrate;
      a plurality of phosphor layers being formed in a predetermined pattern on said at least one anode electrode; and
      a plurality of conductive layers being formed on said phosphor layers, said plurality of conductive layers being made of carbon nanotubes.

2. The flat panel display device of claim 1, with said carbon nanotubes having a length not longer than 5 micrometers.

3. The flat panel display device of claim 1, with said plurality of conductive layers being formed by electrophoresis.

4. The flat panel display device of claim 1, with said at least one anode electrode being formed in a predetermined anode electrode pattern and corresponding to a plurality of anode electrodes formed at a predetermined distance on said second substrate to form a striped pattern.

5. The flat panel display device of claim 4, further comprising:
a plurality of black matrix layers being formed between said plurality of anode electrodes, said plurality of black matrix layers not contacting said plurality of anode electrodes.

6. The flat panel display device of claim 5, with said plurality of black matrix layers being electrically conductive and contacting said plurality of conductive layers.

7. The flat panel display device of claim 4, further comprising:
a plurality of black matrix layers being formed between said plurality of anode electrodes, said plurality of black matrix layers contacting said plurality of anode electrodes.

8. The flat panel display device of claim 7, with said plurality of black matrix layers being electrically conductive and contacting said plurality of conductive layers.

9. The flat panel display device of claim 1, with said at least one anode electrode including indium tin oxide.

10. The flat panel display device of claim 1, with said at least one anode electrode being formed as a single unit covering over 80% of the first surface of said second substrate.

11. The flat panel display device of claim 1, said electron emission assembly comprising:
a plurality of cathode electrodes being formed on a first surface of said first substrate to face said second substrate, the first surface of said first substrate facing said second substrate;
at least one gate electrode being formed on the first surface of said first substrate to face said second substrate;
an insulation layer separating said plurality of cathode electrodes from said at the least one gate electrode; and
a plurality of electron emission sources being formed on said plurality of cathode electrodes and being positioned within holes formed in said insulation layer and in said at least one gate electrode.

12. The flat panel display device of claim 11, with said plurality of electron emission sources including at least one carbon-based material selected from the group consisting of carbon nanotubes, fullerenes, diamond-like carbon, graphite, and a mixture of these materials.

13. The flat panel display device of claim 1, said electron emission assembly comprising:
at least one gate electrode being formed on the first surface of said first substrate to face said second substrate;
an insulation layer being formed on the gate electrode;
a plurality of cathode electrodes being formed on the insulation layer; and
a plurality of electron emission sources being mounted on said plurality of cathode electrodes.

14. The flat panel display device of claim 13, with said plurality of electron emission sources including at least one carbon-based material selected from the group consisting of carbon nanotubes, fullerenes, diamond-like carbon, graphite, and a mixture of these materials.

15. A flat panel display device, comprising:
a first substrate;
an electron emission assembly being formed on said first substrate;
a second substrate being provided at a predetermined distance from said first substrate, said first and second substrates forming a vacuum assembly;
an illumination assembly being formed on said second substrate, said illumination assembly being illuminated by electrons emitted from said electron emission assembly, said illumination assembly comprising at least one anode electrode being formed on a first surface of said second substrate to face said first substrate, the first surface of said second substrate facing said first substrate, a plurality of phosphor layers being formed in a predetermined pattern on said at least one anode electrode, and a plurality of conductive layers being formed on said phosphor layers, said plurality of conductive layers being formed of a carbon-based material; and
a plurality of black matrix layers being formed between said plurality of anode electrodes, said plurality of black matrix layers contacting said plurality of conductive layers.

16. The flat panel display device of claim 15, said plurality of conductive layers being made of carbon nanotubes.

17. The flat panel display device of claim 15, said plurality of black matrix layers contacting said plurality of anode electrodes.

18. The flat panel display device of claim 15, said plurality of black matrix layers being electrically conductive.

* * * * *